(12) United States Patent
Weber

(10) Patent No.: US 9,254,810 B2
(45) Date of Patent: Feb. 9, 2016

(54) FASTENING DEVICE FOR DETACHABLY FASTENING AN ELEMENT TO A COMPONENT FIXED TO A VEHICLE

(75) Inventor: Marcus Weber, Untertheres (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 105 days.

(21) Appl. No.: 14/006,590

(22) PCT Filed: Feb. 16, 2012

(86) PCT No.: PCT/EP2012/000676
§ 371 (c)(1),
(2), (4) Date: Sep. 20, 2013

(87) PCT Pub. No.: WO2012/126553
PCT Pub. Date: Sep. 27, 2012

(65) Prior Publication Data
US 2014/0016990 A1    Jan. 16, 2014

(30) Foreign Application Priority Data
Mar. 23, 2011   (DE) .......................... 10 2011 014 869

(51) Int. Cl.
| | |
|---|---|
| *E01F 9/018* | (2006.01) |
| *F16D 9/00* | (2006.01) |
| *F16P 5/00* | (2006.01) |
| *B60R 21/217* | (2011.01) |
| *F42B 3/00* | (2006.01) |
| *B60R 21/2338* | (2011.01) |

(52) U.S. Cl.
CPC .................. *B60R 21/217* (2013.01); *F42B 3/00* (2013.01); *F42B 3/006* (2013.01); *B60R 2021/23384* (2013.01); *Y10T 403/11* (2015.01)

(58) Field of Classification Search
CPC .................. B60R 21/217; B60R 2021/23384; F42B 3/00; F42B 3/006; Y10T 403/11; Y10T 403/7015

USPC ......... 403/2, 353; 411/20, 390, 391; 280/737, 280/743.2
See application file for complete search history.

(56) References Cited

U.S. PATENT DOCUMENTS

| | | | | |
|---|---|---|---|---|
| 3,389,873 | A | * | 6/1968 | Filippi et al. .................. 242/374 |
| 3,917,031 | A | * | 11/1975 | Doin et al. ..................... 188/375 |
| 7,469,926 | B2 | * | 12/2008 | Lewis et al. ................... 280/736 |
| 8,172,261 | B2 | * | 5/2012 | Fischer et al. ................. 280/739 |
| 2006/0055159 | A1 | | 3/2006 | Fischer et al. |
| 2009/0309342 | A1 | * | 12/2009 | Schonhuber et al. ......... 280/737 |
| 2010/0090450 | A1 | | 4/2010 | Webber |
| 2010/0187797 | A1 | * | 7/2010 | Debler et al. .................. 280/737 |

FOREIGN PATENT DOCUMENTS

| | | |
|---|---|---|
| DE | 10 2005 029 487 A1 | 1/2007 |
| DE | 10 2009 005 771 A1 | 7/2010 |
| EP | WO 2007/065709 A1 | 6/2007 |
| EP | 1 796 978 B1 | 2/2008 |

OTHER PUBLICATIONS

PCT International Search Report—Sep. 27, 2012.

* cited by examiner

*Primary Examiner* — Gregory Binda
*Assistant Examiner* — Nahid Amiri
(74) *Attorney, Agent, or Firm* — Brinks Gilson & Lione

(57) ABSTRACT

A fastening device for detachably fastening an automotive airbag component. The fastening device has a holding device (10), a connecting element (20) extending from a first end (21a) to a second end (22a), which, is normally connected to a fastening section of the holding device (10), and a pyrotechnic charge, which, on ignition, causes an end (22a) of the connecting element (20) to be detached from the fastening section. The holding device (10) has a bearing through which the connecting element (20) extends with a section spaced from the first end (21a). This bearing has at least two bearing surfaces (16a, 18a) separated differently from the fastening section and arranged on different sides of the connecting element, so that the separated section of the connecting element (20) can tilt in the bearing after the ignition of the pyrotechnic charge.

8 Claims, 2 Drawing Sheets

FASTENING DEVICE FOR DETACHABLY FASTENING AN ELEMENT TO A COMPONENT FIXED TO A VEHICLE

CROSS REFERENCE TO RELATED APPLICATIONS

This application claims priority to German Patent Application No. 10 2011 014 869.8, filed Mar. 23, 2011 and PCT/EP2012/000676, filed Feb. 16, 2012.

FIELD OF THE INVENTION

The invention relates to a fastening device for detachably fastening an element to a component fixed to a motor vehicle.

PRIOR BACKGROUND

A fastening device is described in WO2007065709A1. In the publication, a gas generator is shown which carries a holding device firmly connected to the gas generator, on which a connecting element is rigidly held in the idle state. This connecting element extends from a first end to a second end and a pyrotechnic charge is arranged inside this connecting element, which on ignition provides for the destruction of the connecting element such that a first part of the connecting element, which is rigidly connected to the holding device, stays connected and the second part breaks. As a result of said destruction of the connecting element, a catch strap, or the like, is released. The described device is, for example, suitable for controlling a valve or the depth of an airbag. In such cases, when the airbag is unfolded, tension is generated as a rule in the catch strap.

In order to prevent the free movement of the split-off second part of the connecting element, a retaining means is provided, for example, in the form of a cord. In this way, although the radius of movement of the separated second part of the connecting element can be delimited, the separated second part of the connecting element can damage other components. This is, in particular, a problem because the speed of the separated second part can be very high.

A fastening device is known from the category-defining DE 10 2009 005 771, in which the connecting element cannot separate from the holding device, even after ignition of the pyrotechnic charge. In this case the connecting element also breaks into two parts after the ignition of the pyrotechnic charge, wherein the first part of the connecting element remaining rigidly connected to the holding device. In order to ensure that the second part cannot separate from the holding device, the holding device has a bearing through which the second part extends, and in which it can perform a limited axial linear movement.

SUMMARY OF THE INVENTION

On this basis, the object of the present invention is to further develop a generic fastening device so that the release of the element kept in an idle state is ensured in any case after the ignition of the pyrotechnic charge.

This object is attained by means of a fastening device having the characteristics described herein.

As well as the prior art fastening device described above, the fastening device according to the present invention also has a holding device, which is connected or can be connected, to a component fixed to the vehicle and a connecting element extending from a first to a second end. In this case, the first end of this connecting element is connected to a fastening section of the holding device in an at least initial condition, namely the idle state (or undeployed state of the airbag), connected with a fastening section of the holding device, wherein the connection is firm and preferentially rigid. As in prior art, a pyrotechnic charge is likewise provided, which, on ignition, has the effect that at least the second end of the connecting element is no longer rigidly connected to the fastening section, so that one element, which is held by means of the connecting element, can be released. The second end of the connecting element is preferentially separated from the fastening section because the connecting element breaks into two parts, so that the first end of the connecting element is separated from the second end, wherein the first end stays connected to the fastening section.

In order to prevent an unbraked, free removal of the section of the connecting element (which could basically also be the entire connecting element) separated after the ignition of the pyrotechnic charge from the holding device, this holding device also has a bearing through which the connecting element extends with a section axially spaced apart from the first end.

According to the present invention, the section of the connecting element separated after the ignition of the pyrotechnic charge can tilt in this bearing in order to release the previously held element. This element, a tensioning element in the form of a catch strap by way of example, is under tension at the time of ignition of the pyrotechnic charge, so that the separated section will always tilt. This will ensure that even a strongly tensioned catch strap will not hinder the movement of this section, but still support it. As a result of this tilting movement in the bearing, the separated section virtually loses all its kinetic energy generated by the ignition of the pyrotechnic charge, and therefore can only drop out of the bearing at a very low and harmless speed.

To facilitate a strong tilt of the separated section without having to configure parts of the bearing to be movable, the bearing has two bearing surfaces which are axially separated from the fastening section. In this case, both bearing surfaces are arranged, preferentially rigidly, on different sides of the peripheral surface of the connecting element.

The holding device can be configured in one or multiple parts, which can be advantageous depending on the application, as will be seen later with reference to both exemplary embodiments.

Preferred exemplary embodiments will be apparent from the subclaims.

BRIEF DESCRIPTION OF THE DRAWINGS

The invention will now be explained in more detail by means of two exemplary embodiments with reference to the drawings, which show.

DESCRIPTION OF PREFERRED EMBODIMENTS

Figure 1:
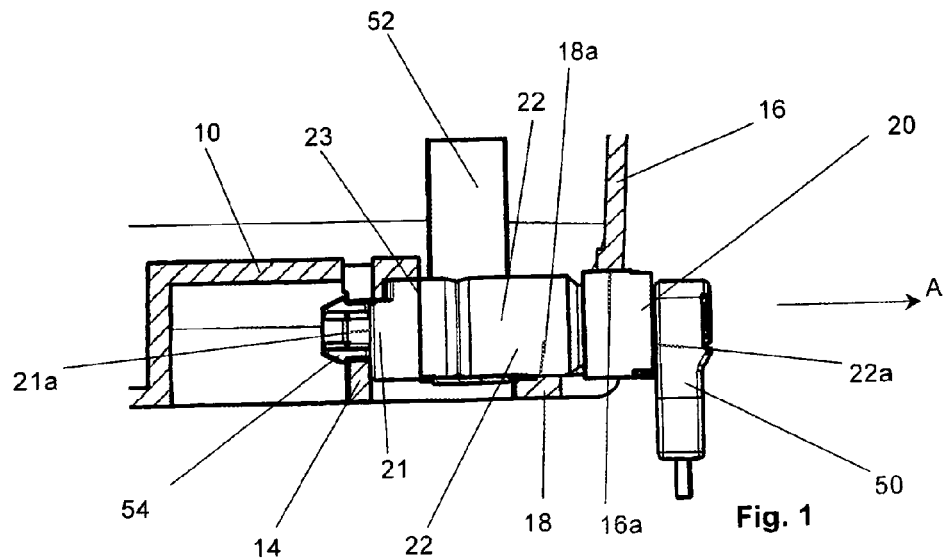
FIG. 1 is a cross-section of a first exemplary embodiment of the invention.

FIG. 1 shows a first exemplary embodiment of a fastening device according to the present invention in an idle state (undeployed state of the airbag). The fastening device has two basic components, namely the crosshatched holding device 10, which can be part of a component fixed to the vehicle, or which can be connected to a component fixed to the vehicle, such as a gas generator by way of example, and the connecting element 20 held by the holding device 10. The holding device 10 has three essential functional sections here, namely a screwing section 14, a first strut 16 with a first bearing surface 16a, and a second strut 18 with a second bearing surface 18a. Both bearing surfaces 16a and 18a can preferentially be configured as hollow semi-cylinders (not visible due to the selected cross-section), whereon both bearing surfaces 16a, 18a are basically oriented in opposite directions (i.e. opposite sides of the center-line of connecting element 20). Furthermore, in the axial direction A, both bearing surfaces 16a and 18a have a different separation from the screwing section 14, than the first bearing surface 16a.

The basically cylindrical connecting element 20, which extends in the axial direction A from a first end 21a to a second end 22a, is held in the holding device 10. The first end 21a is screwed to the screwing section 14; the second end 22a is connected to an ignition cable plug socket 50. A predetermined breaking point 23 is provided which divides the connecting element 20 in a first part 21 and in a second part 22. As described by way of example in W2007/065709A1, a pyrotechnic charge is provided inside the connecting element 20, which, upon ignition, separates the second part 22 from the first part 21, i.e. breaks the connecting element 20. The second part 22, i.e. the section of the connecting element axially spaced apart from the first end 21a, extends through the bearing formed by both bearing surfaces 16a, 18a.

In the idle state (undeployed state of the associated airbag), a catch strap 52 is connected to the connecting element 20, and thus to the fastening device, by means of a sling that extends around the connecting element 20 (not visible in the selected view). As shown in FIG. 1, the catch strap 52 extends away from the second bearing surface 18a, i.e. from the bearing surface situated closer to the screwing section in the axial direction.

Figure 2:
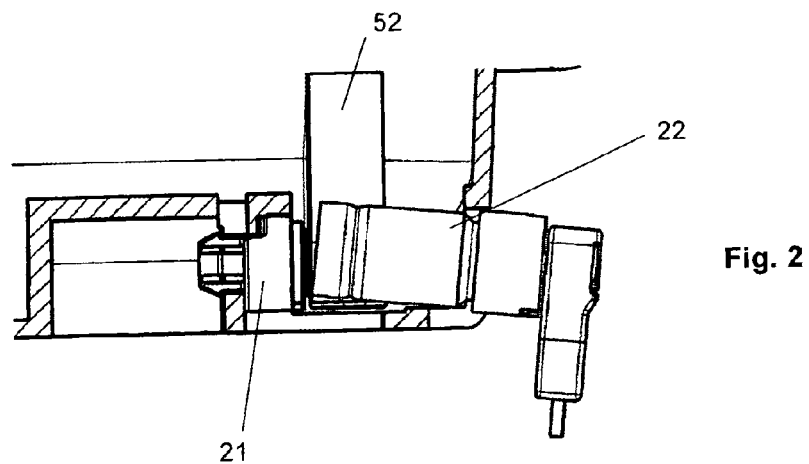
FIG. 2 shows the elements after the ignition of the pyrotechnic charge in the connecting element.
Figure 3:
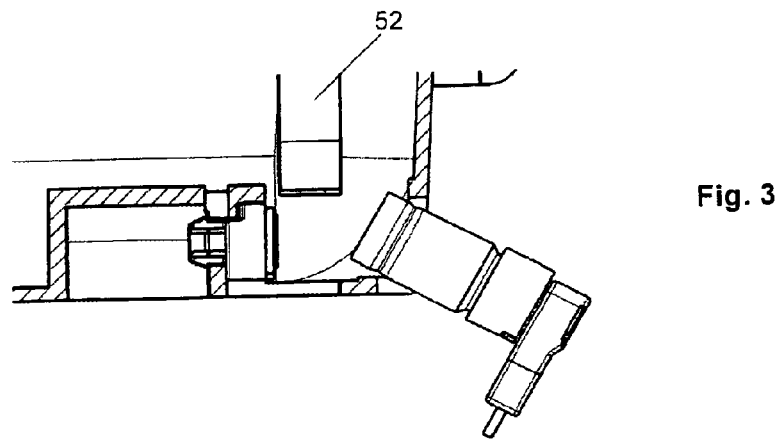
FIG. 3 shows the elements after the release of a catch strap previously held by the connecting element.

If, as shown in FIG. 2, the pyrotechnic charge is now ignited, the connecting element 20 breaks into the first part 21 and into the second part 22, the first part staying rigidly connected to the holding device 10. At the same time, the catch strap 52, which is ordinarily under tension during airbag deployment, pulls from the separated second part 22, i.e. from the section of the connecting element 20 which extends through the bearing, and forces it to perform a combined axial and tilting movement, as shown in FIG. 2, whereupon the catch strap 52 (or another equivalent element) is released. By tilting, the separated second part 22, however, releases its entire kinetic energy and, as shown in FIG. 3, will only drop out of the bearing, for example owing to gravity. The object of the present invention is thus accomplished.

The second part 22 of the connecting element 20 can then only separate from the holding device 10, if it is exactly moving in the axial direction, which will, however, not occur due to the force applied by the catch strap 52, and which would likewise not occur without the application of force owing to the asymmetrical configuration of the bearing.

The connecting element 20 is assembled by exact axial placement in the holding device, and subsequently screwing it to the first end 21a by means of the screw 54.

Figure 4:
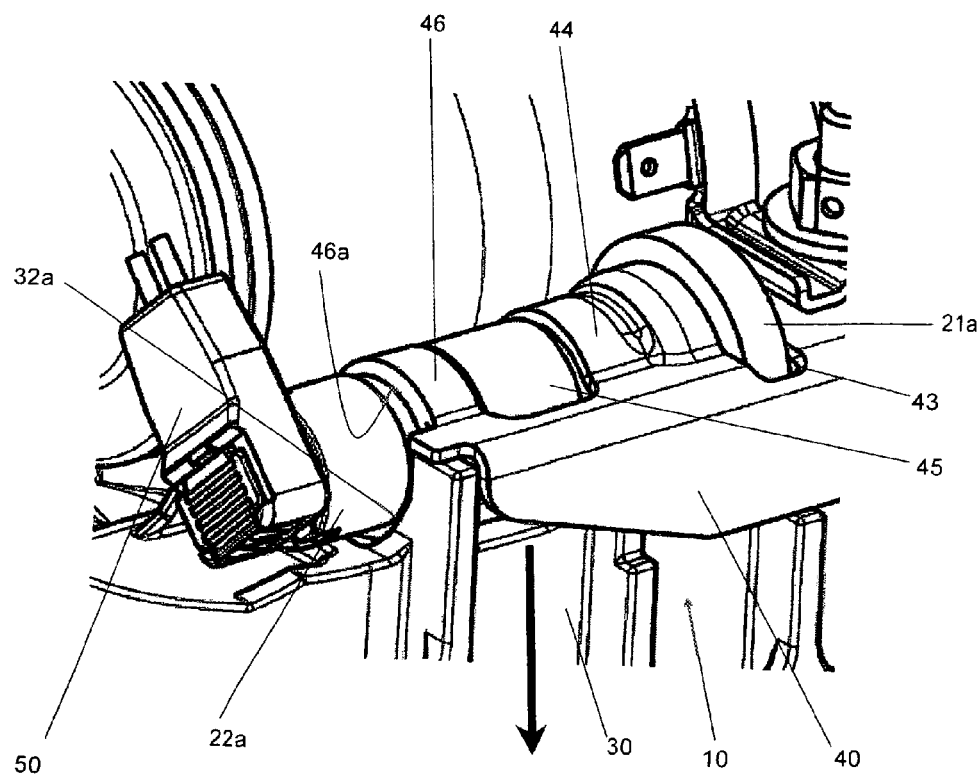
FIG. 4 is a perspective view of a second exemplary embodiment of the invention in the idle state (undeployed state of the airbag), wherein the catch strap held by the connecting element is not shown.

FIG. 4 shows a second exemplary embodiment, whose fundamental mode of operation is very similar to that of the first exemplary embodiment. In this case, the main difference is that the holding device 10 is constructed in two parts, namely with a first element 30 and a second element 40. Here, the second element 40 is configured as a covering element, in particular as a cover plate. The first element 30 and the second element 40 are firmly connected to one another, and the second connecting element 20 has been incorporated between the first element 30 and the second element 40. The first end 21a of the connecting element 20 is thickened in relation to the rest of the connecting element 20 and extends through a slot 43 of the second element 40. The first element 30 can have a corresponding groove which cannot be seen owing to the depiction shown. The slot 43 and, as the case may be, the groove form the fastening section of the holding device 10. Owing to the design, the connecting element 20 is held in the two-piece holding device 10, so that screwing or the like is not necessary.

Here, the first surface bearing 32a is associated with the first element 30 and the second bearing surface 46a is associated with the second element 40. For this purpose, the second element 40 has two encompassing sections 44, 46, each of which approximately encompasses half of the periphery of the connecting element 20. The second bearing surface 46a is the inner side of the second encompassing section 46. There is a free space 45 between both encompassing sections 44, 46 for the arrangement of the sling of a catch strap, or a similar element, extending around the connecting element 40. The direction of extension of the catch strap is indicated by means of the arrow in FIG. 4; the catch strap as such is not shown.

In this case, the assembly is slightly different than in the first exemplary embodiment. Here, the connecting element 20 is namely arranged on the first element 30, and the second element 40 is then connected to the first element 30, so that the connecting element 20 is held between the first and the second element. The mode of operation and kinematics are similar to those in the first exemplary embodiment, so that there is no need for a separate explanation.

While the above description constitutes the preferred embodiment of the present invention, it will be appreciated that the invention is susceptible to modification, variation and change without departing from the proper scope and fair meaning of the accompanying claims.

The invention claimed is:

1. A fastening device for detachably fastening an element to a component fixed to a motor vehicle, comprising, a holding device that is connected, or can be connected, to the component fixed to the vehicle, a connecting element extending in an axial direction from a first end to a second end, which, in a first state, is connected to a fastening section of the holding device via the first end, and a pyrotechnic charge, which on ignition has the effect that at least the second end of the connecting element is no longer rigidly connected to the fastening section, wherein the holding device forms a bearing, through which the connecting element extends with a section axially spaced apart from the first end, the bearing has at least two bearing surfaces, wherein both bearing surfaces are disposed in different axial locations from the fastening section and arranged on different sides of a peripheral surface of the connecting element, so that the second end of the connecting element, upon separation of the connecting element will tilt in the holding element relative to the longitudinal axis and will tilt away from both of the bearing surfaces after the ignition of the pyrotechnic charge.

2. The fastening device according to claim 1, further comprising in that the pyrotechnic charge is arranged inside the connecting element such that the connecting element breaks into two parts on ignition of the pyrotechnic charge.

3. The fastening device according to claim 2, further comprising in that the first end of the connecting element also stays connected to the fastening section after the ignition of the pyrotechnic charge.

4. The fastening device according to claim 3, further comprising in that the connection between the first end and the fastening section is rigid.

5. A fastening device according to claim 1 further comprising in that both bearing surfaces belong to different elements of the holding device which are rigidly connected to one another during assembly of the fastening device.

6. The fastening device according to claim 5, further comprising in that the fastening section is composed of both of the different elements of the holding device, the fastening section being configured such that the first end of the connecting element is held between the different elements of the holding device.

7. A fastening device according to claim 1 further comprising in that both bearing surfaces belong to only one element of the holding device.

8. The fastening device according to claim 7, further comprising in that the first end of the connecting element is screwed or riveted to the fastening section of the holding device.

* * * * *